United States Patent
Sato et al.

(10) Patent No.: US 6,946,945 B2
(45) Date of Patent: Sep. 20, 2005

(54) ELECTRONIC COMPONENT AND METHOD OF MANUFACTURING THE SAME

(75) Inventors: Satoshi Sato, Miyazaki (JP); Takuya Fujimaru, Miyazaki (JP); Yasuhiro Izumi, Miyazaki (JP); Yoshito Yoneda, Miyazaki (JP); Yasunori Tabaru, Miyazaki (JP); Yoshihiro Kiyomura, Oonojo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 350 days.

(21) Appl. No.: 10/260,544

(22) Filed: Oct. 1, 2002

(65) Prior Publication Data

US 2003/0079904 A1 May 1, 2003

(30) Foreign Application Priority Data

Oct. 3, 2001 (JP) ........................................ 2001-307269

(51) Int. Cl.[7] .............................................. H01F 27/02
(52) U.S. Cl. ............................ 336/200; 336/83; 336/232
(58) Field of Search ................................. 336/200, 223, 336/232, 83, 192; 29/602.1, 606

(56) References Cited

U.S. PATENT DOCUMENTS

| 5,629,538 | A | | 5/1997 | Lipphardt et al. |
| 5,764,126 | A | * | 6/1998 | Kanetaka et al. ............. 336/96 |
| 5,963,119 | A | | 10/1999 | Takeda et al. |
| 6,084,500 | A | * | 7/2000 | Kanetaka et al. ............ 336/223 |
| 6,087,921 | A | * | 7/2000 | Morrison ..................... 336/200 |
| 6,094,123 | A | * | 7/2000 | Roy ............................ 336/200 |
| 6,388,550 | B1 | * | 5/2002 | Kanetaka et al. ............ 336/223 |
| 6,393,691 | B1 | * | 5/2002 | Ogawa et al. ............. 29/602.1 |
| 6,492,885 | B1 | * | 12/2002 | Murata et al. ............... 333/185 |
| 6,609,009 | B1 | * | 8/2003 | Kiyosue et al. .......... 455/550.1 |
| 6,864,774 | B2 | * | 3/2005 | Kanetaka et al. .............. 336/83 |

FOREIGN PATENT DOCUMENTS

| JP | 62-88399 | 4/1987 |
| JP | 2-224212 | 9/1990 |
| JP | 4-280407 | 10/1992 |
| JP | 5-129133 | 5/1993 |
| JP | 7-272215 | 10/1995 |
| JP | 7-297033 | 11/1995 |
| JP | 7-307479 | 11/1995 |
| JP | 11-3820 | 1/1999 |
| JP | 2001-15341 | 1/2001 |
| JP | 2001-15342 | 1/2001 |
| JP | 2001-185425 | 7/2001 |

* cited by examiner

Primary Examiner—Anh Mai
(74) Attorney, Agent, or Firm—McDermott Will & Emery LLP

(57) ABSTRACT

In an electronic component, an element section is formed on a base, and the element section has functions of at least one of inductance, resistor, and capacitor. Resist film is formed on at least the lateral faces of the base. An unnecessary part of patterned resist film is removed, and a protective member is formed on that removed place. Then remaining resist film is removed. This manufacturing method can provide the electronic component excellent in bonding strength between the protective member and the base.

17 Claims, 11 Drawing Sheets

ELECTRONIC COMPONENT AND METHOD OF MANUFACTURING THE SAME

FIELD OF THE INVENTION

The present invention relates to an electronic component used in electronic device of the mobile communication field, and it also relates to a method of manufacturing the same component.

BACKGROUND OF THE INVENTION

Chip electronic components include components of which elements are covered with protective member. This kind of components are manufactured in this way: first, form conductive film by electroplating method on the surface of a base, second, work the conductive film to form an element section, then cover the element section with a protective member.

This type of chip electronic component uses a protective member formed by applying insulating paste. This paste-applying method has not posed any serious problems in rather large size components so far.

However, small size components, of which dimensions are 1.0×0.5 mm and 0.6×0.3 mm, are recently commercialized. In the near future, the smaller component such as 0.4×0.2 mm will be in the market.

Downsizing electronic components poses a problem that element-standing upright (so-called "Manhattan phenomenon") phenomenon remarkably occurs because the protective member is formed round when paste is applied.

In addition to this problem, terminal electrodes formed on both the edges of the electronic component have dispersion in shape because of poor accuracy of the paste application. These problems adversely affect the properties of the electronic component.

For overcoming these problems, Japanese Patent Application Non-examined Publication No. H11-3820 discloses a method of forming a protective member by electrodeposition. However, when just the protective member of an electronic component is formed of electrodeposited film, the film attaches to everywhere of the element. Thus the electrdeposited film attached to both the ends of the element should be removed when terminal electrodes are formed. This removal work requires a lot of time, and blocks the productivity from increasing. The removal of the electrodeposited film possibly damages the conductive film formed on the base, then the properties are degraded or dispersed.

The foregoing prior art discloses a method of avoiding the attachment of the electrodeposited film to both the ends of the element, i.e., both the ends are covered by some jig, however, electrodeposition liquid tends to enter through a space between the element and the jig. Thus electrodeposited film is formed on both the ends of the elements, and the film prevents the terminal electrodes from being formed on both the ends. Further, if the protective member is formed by applying paste or by the electrodeposition method, the edge of the protective member becomes bumpy. Thus side face toward the element center of the terminal electrode becomes also bumpy, which adversely affect to mounting of the component or the properties of the component.

A thickness of the protective member becomes thinner as the electronic component is downsized, which weakens bonding strength between the protective member and the element.

For stabilizing the properties of electronic components, and increasing the mounting efficiency and the productivity of the electronic components, there are the following major objectives to be achieved. They are, efficient and accurate formation of the protective member, and increasing adhesion strength between the protective member and an element.

SUMMARY OF THE INVENTION

The present invention addresses the foregoing problems and aims to provide an electronic component comprising the following elements:

(a) a base;
(b) a film provided to said base;
(c) a groove formed on both of said base and said film;
(d) a resin section provided in a recess formed on a bottom of said groove;
(e) a protective member for covering said groove and being bonded to said resin section; and
(f) a terminal section provided to both ends of said base and sandwiching said protective member.

BRIEF DESCRIPTION OF THE INVENTION

DETAILED DESCRIPTION OF EXEMPLARY EMBODIMENT

An exemplary embodiment of the present is specifically demonstrated hereinafter with reference to the accompanying drawings. The drawings are schematic ones and they do not exactly indicate dimensional relations of the elements.

The electronic component of the present invention refers to the components, of which elements are formed on a surface of a base, such as a chip inductor, chip resistor, chip capacitor, chip antenna, chip current-fuse and the like.

Figure 1:
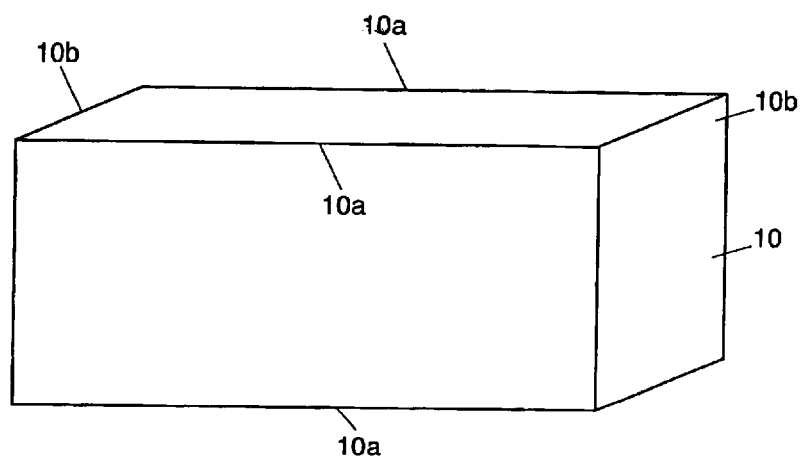
FIG. 1 is a perspective view illustrating a method of manufacturing an electronic component in accordance with an exemplary embodiment of the present invention.
Figure 2:
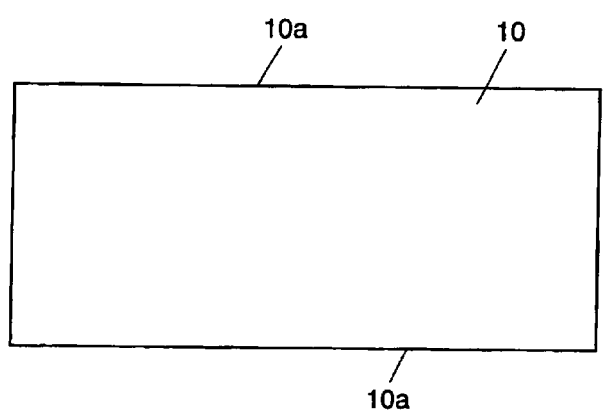
FIG. 2 is a sectional view illustrating the method of manufacturing the electronic component in accordance with the exemplary embodiment of the present invention.

First, form pillar-like base 10 as shown in FIG. 1 and FIG. 2 by press molding or extrusion molding. Base 10 is made of at least one material selected from a group consisting of ceramic material such as aluminum oxide, insulating material such as resin, and magnetic material such as ferrite. Base 10 is preferably shaped like a board or a pillar. To be more specific, a polygonal pillar such as a square pillar as shown in FIG. 1, a pentagonal pillar or a cylindrical pillar is used. When easiness of mounting the component is taken into consideration, a polygonal pillar is preferable, and the square pillar, among others, is preferred because of its simple structure. In the case of using the polygonal pillar, the corners are preferably chamfered. Chamfering the corners prevents the conductive film formed on base 10 from thinning at the corners, thereby suppressing the property degradation.

At least corner sections 10a formed by lateral faces of base 10 are desirably chamfered. Because on parts of the lateral faces or on the overall lateral faces, an element section having properties of at least one of inductance, resistor and capacitor is formed.

Figure 3:
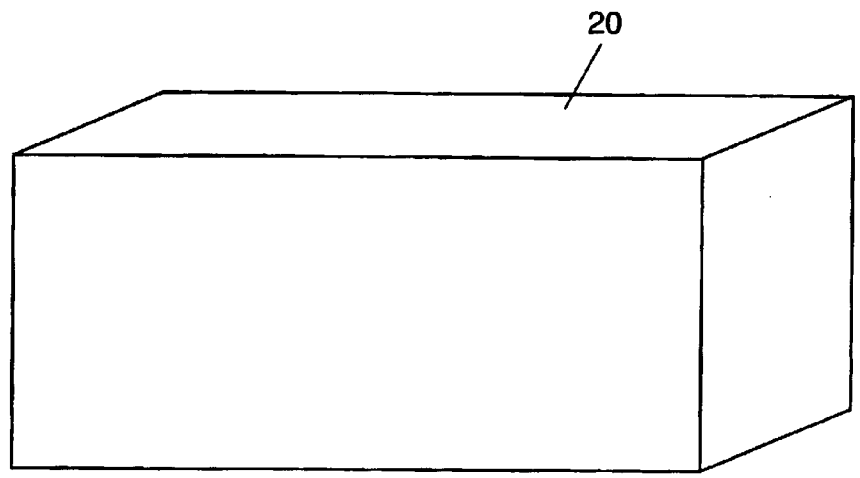
FIG. 3 is a perspective view illustrating the method of manufacturing the electronic component in accordance with the exemplary embodiment of the present invention.
Figure 4:
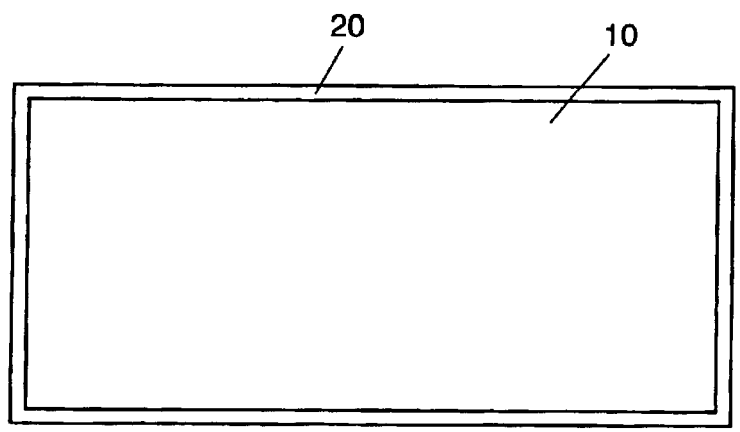
FIG. 4 is a sectional view illustrating the method of manufacturing the electronic component in accordance with the exemplary embodiment of the present invention.

Next, as shown in FIG. 3 and FIG. 4, coat base 10 with film 20 formed of conductive film or resistive film. For instance, when the electronic component is a chip inductor or a chip capacitor, film 20 is formed of conductive film. When the electronic component is a chip resistor, film 20 is formed of restive film or thin conductive film. When the electronic component is a chip antenna, film 20 is formed of conductive film.

When the electronic component is a current fuse, film 20 is formed of resistive film or thin conductive film. Material of film 20 can be electric conductive material or resistive material including gold, silver, copper, carbon, Ni—Cr, ruthenium oxide, nickel. A simple substance of the foregoing materials or an alloy of foregoing materials with another chemical element can be preferably used.
film 20 can be produced by electroless plating, electroplating, vapor deposition, sputtering, or applying and baking paste to base 10.

Figure 5:
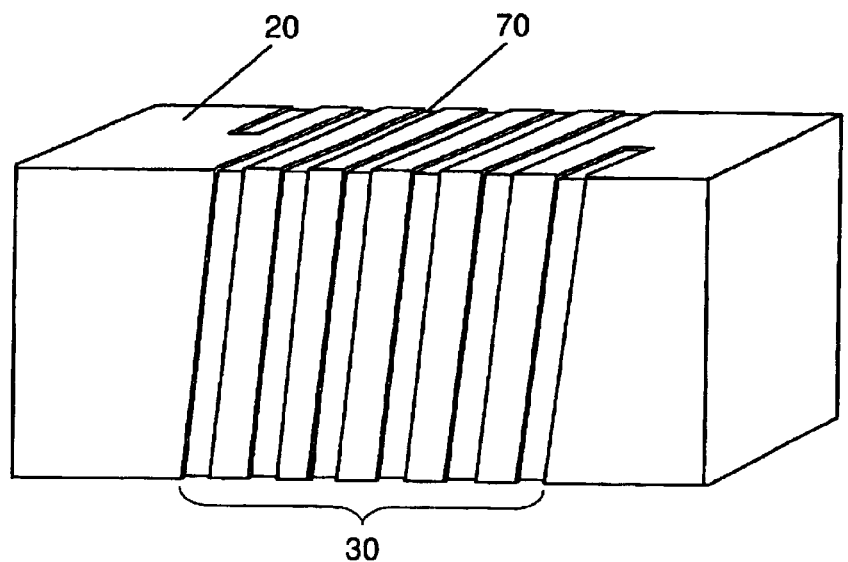
FIG. 5 is a perspective view illustrating the method of manufacturing the electronic component in accordance with the exemplary embodiment of the present invention.
Figure 6:
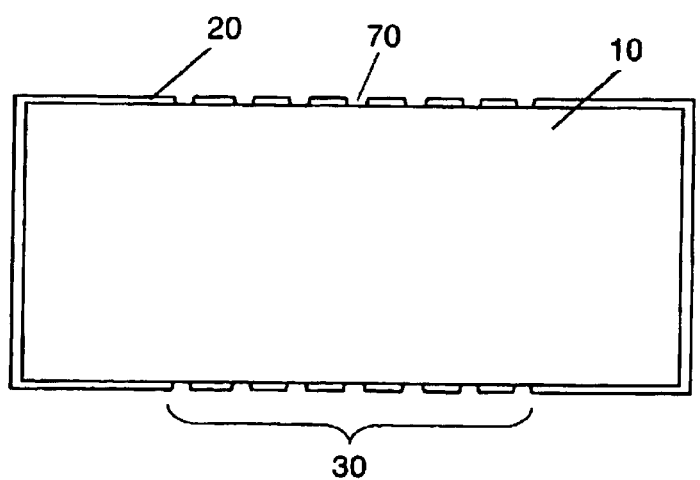
FIG. 6 is a sectional view illustrating the method of manufacturing the electronic component in accordance with the exemplary embodiment of the present invention.

In this embodiment, film 20 is provided to the overall surfaces of base 10; however, film 20 can be provided to entire lateral faces only, or parts of the lateral faces depending on a type of electronic components. In such a case, film 20, produced by the method and with the material discussed above, is provided to parts of the lateral faces, then as shown in FIGS. 5 and 6, element section 30 is formed on base 10 except both the ends, because both the ends are generally used as terminal sections. If a single or more than two terminal sections are prepared at the center or at one end of base 10, the element section is formed avoiding the area where terminal sections are to be formed. A structure of element section 30 differs depending on types of electronic components. Respective component types are described as follows.

First, in the case of the electronic component being a chip inductor, film 20 is formed of conductive film made of copper and the like film 20 is provided to at least overall lateral faces of base 10. Grooves 70 are formed on the surface of film 20 or those of film 20 and base 10 as shown in FIGS. 5 and 6 by trimming with laser beam or grinding wheel.

Cutting helical grooves 70 on the overall lateral faces of base 10 results in leaving film 20 in helical shape on base 10. The axial core of this helical-shape film 20 crosses with end face 10b of base 10.

The width and winding density of the grooves can be adjusted, whereby inductance is adjustable. A chip antenna is obtainable in a similar way.

A chip resistor can be obtained by replacing film 20 with resistive film.

In the case of a chip capacitor, film 20 is provided in advance on base 10, and grooves are cut by trimming as discussed above to divide film 20 into plural sections, whereby element section 30 is formed.

In the case of a chip current fuse, grooves are formed circularly around base 10 by the trimming method, and yet, a narrow section (blowout section) is prepared on film 20 between tips of the grooves, whereby element section 30 is formed. Both of the helical grooves and circular grooves are formed on base 10, so that a composite electronic component such as an LC composite component (a coil and a capacitor are combined) or an LR composite component can be obtained. In this embodiment, grooves are formed by trimming film 20 for forming element section 30 in any type of electronic components. However, instead of trimming film 20, helical-like conductive film is prepared in advance by pattern formation, whereby a chip inductor or a chip antenna is obtainable, or helical-like resistive film is prepared, so that a chip resistor can be obtained.

Figure 7:
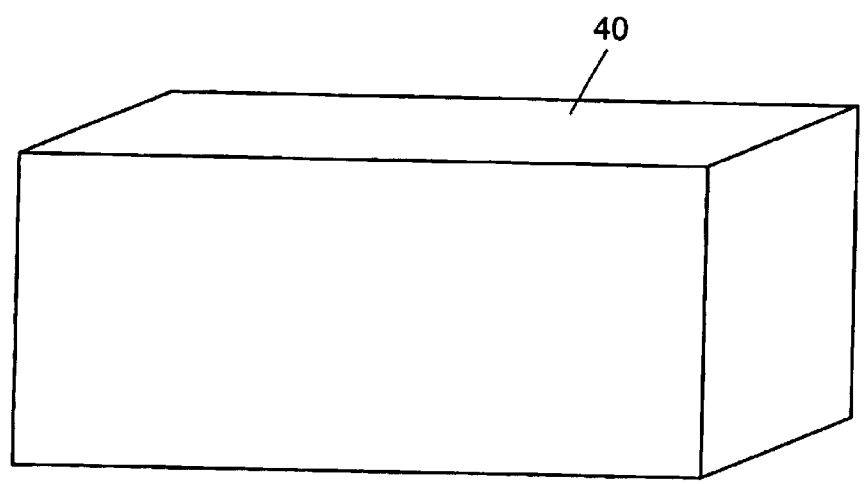
FIG. 7 is a perspective view illustrating the method of manufacturing the electronic component in accordance with the exemplary embodiment of the present invention.
Figure 8:
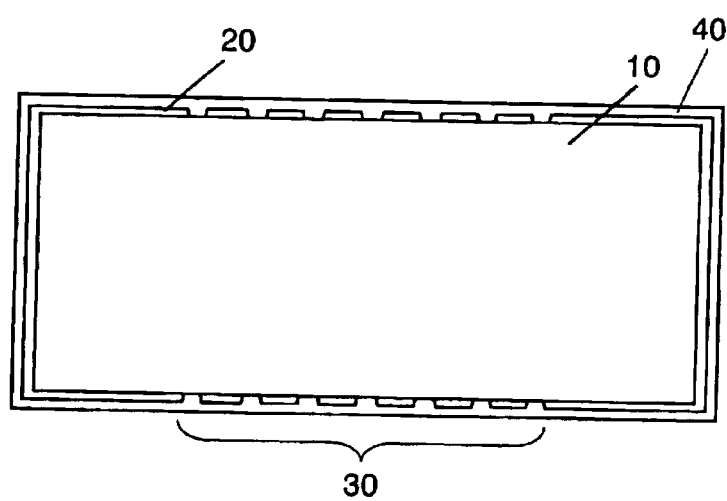
FIG. 8 is a sectional view illustrating the method of manufacturing the electronic component in accordance with the exemplary embodiment of the present invention.

Then as shown in FIGS. 7 and 8, resist film 40 covering the overall elements is formed. Either one of positive-type film or negative-type film can be used as resist film 40. As a material of resist film 40, the following resins are preferably used: energy beam curable resin or energy beam degradation resin such as ultraviolet curable resin, ultraviolet degradation resin, electron beam curable resin, electron beam degradation resin, visible light curable resin, visible light degradation resin, X-ray curable resin, X-ray degradation resin, radiation curable resin, and radiation degradation resin.

To be more specific, epoxy resin (e.g. phenolic novolac type) or acrylic resin (e.g. urethane acrylate) is used.

Since the foregoing materials can be cured or degraded by energy beam, patterning can be done with high accuracy. Heat curable resin or heat degradation resin can be used as resist film 40. To be more specific, they are acrylic resin, urethane-based resin, epoxy resin, urea resin and melanin resin.

Resist film 40 can be formed by an applying and drying method, or formed by the electrodeposition method before drying.

The electrodeposition method can form resist film 40 substantially thin, and yet, it is preferable that films 40 at the corners of the elements are not rounded. In other words, resist film 40 can be formed along the surface of the elements with ease. When resist film 40 is formed by the electrodeposition method, the film thickness preferably ranges from 3 to 30 μm (5–20 μm is more preferable). If the thickness is less than 3 μm, the film cannot fully cover the elements, or the film possibly attaches to places where protective member should not attach. On the other hand, if the thickness is greater than 30 μm, resist film 40 rounds out, which blocks the protective member from being formed accurately. Resist film 40 can be formed by an electrostatic powder coating method or an ultraviolet curable coating method instead of the electrodepostion method.

In the case of using ultraviolet degradation resin as resist film 40, the following steps are taken: First, form resist film 40 on the elements by the electrodeposition method, then dry it for 5–10 minutes at a temperature ranging from 80 to 120° C. Next, irradiate ultraviolet ray for several to ten plus several seconds only to area "A" shown in FIG. 9 using a shielding mask. At this time, ultraviolet ray is irradiated to lateral faces marked "A" around the element. Area "A" is to become element section 30, and areas "B" are to become the terminal sections.

Figure 10:
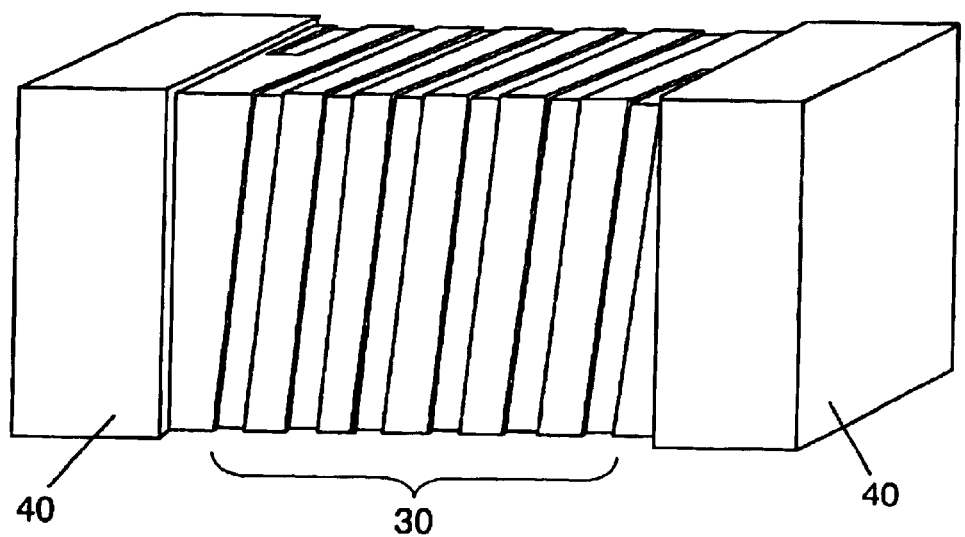
FIG. 10 is a perspective view illustrating the method of manufacturing the electronic component in accordance with the exemplary embodiment of the present invention.

Develop resist film 40 irradiated by ultraviolet ray with developer, then resist film 40 at the place (substantially area "A") where ultraviolet ray was irradiated is removed, and element section 30 appears. Resist film 40 at area "B" remains on both the ends (refer to FIGS. 10 and 11).

Figure 9:
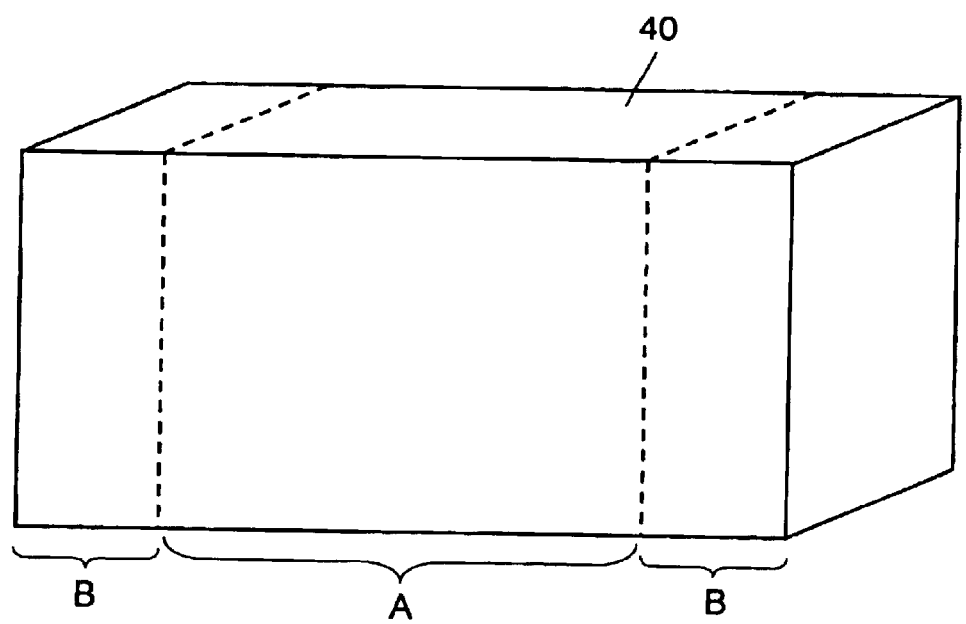
FIG. 9 is a perspective view illustrating the method of manufacturing the electronic component in accordance with the exemplary embodiment of the present invention.

In the case of using ultraviolet curable resin as resist film 40, irradiate ultraviolet ray using a shielding mask to only area "B" shown in FIG. 9. Then remove resist film 40 from area "A" by developing resist film 40 coating the element, so that resist film 40 at area "B" remains.

As discussed above, resist film 40 remains accurately at areas to be terminal sections. As a result, the protective member, which is described later, is prevented from attaching to the areas to be terminal sections, further, bumps on the protective member at the side face toward the element center can be substantially decreased in size. In this embodiment resist film 40 is formed overall on the element; however, in the case of forming resist film 40 or the protective member by the electrodeposition method, a conducive jig is brought into contact with both the end faces 10b in order to easily transfer the component. In this case, resist film 40 is formed practically on the lateral faces only. Therefore, resist film 40 is preferably formed at least on the lateral faces.

Figure 12:
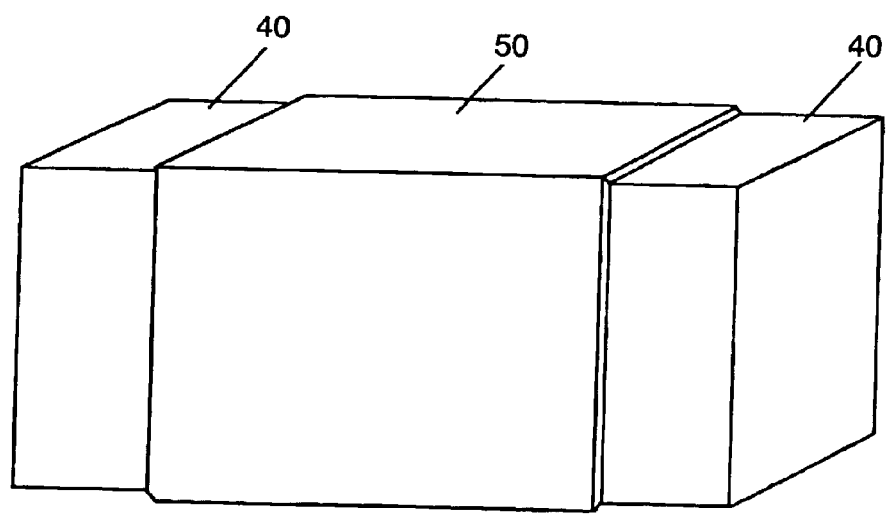
FIG. 12 is a perspective view illustrating the method of manufacturing the electronic component in accordance with the exemplary embodiment of the present invention.
Figure 13:
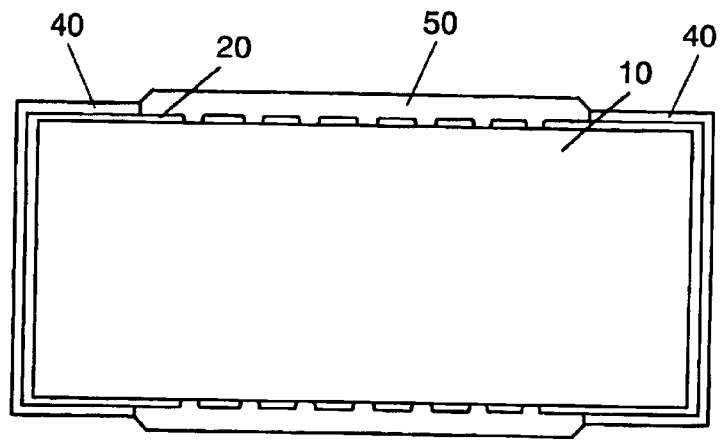
FIG. 13 is a sectional view illustrating the method of manufacturing the electronic component in accordance with the exemplary embodiment of the present invention.

Next, as shown in FIGS. 12 and 13, cover element 30 with protective member 50 made of electrodeposited film. Protective member 50 is formed of at least one electrodeposited resin film selected from the group consisting of acrylic resin, epoxy-based resin, fluorine-based resin, urethane-based resin, and polyimide-based resin.

Selection of cationic electrodeposited film or anionic electrodeposited film depends on a material of the element, a material of the electrodeposited film and a use of the electronic component. Protective member 50 can be formed by laminating electro-deposited films made of different materials, or laminating the films made of the same material.

Film thickness of protective member 50 preferably averages to 10 to 25 μm (more preferably 12 to 20 μm). The film thickness of protective member 50 is preferably thicker than that of resist film 40. Protective member 50 is preferably made of the heat-resistive material that cannot burn or vaporize at 183° C., i.e., melting point of solder.

Figure 14:
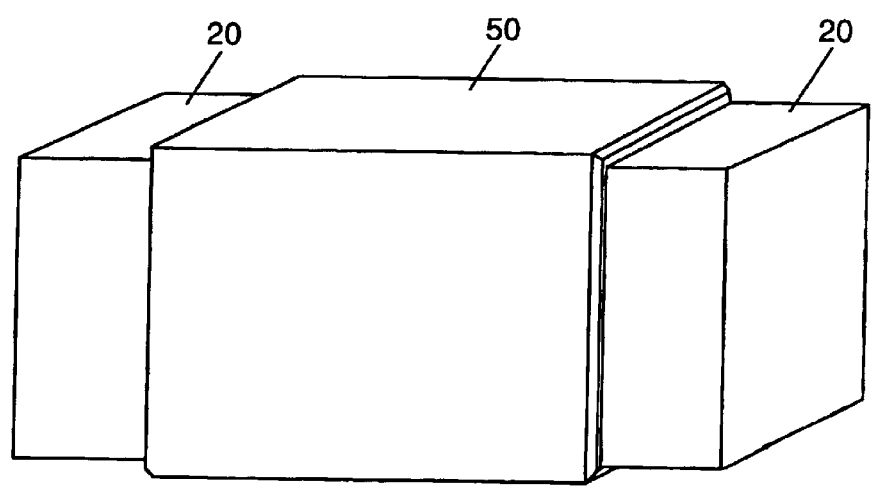
FIG. 14 is a perspective view illustrating the method of manufacturing the electronic component in accordance with the exemplary embodiment of the present invention.
Figure 15:
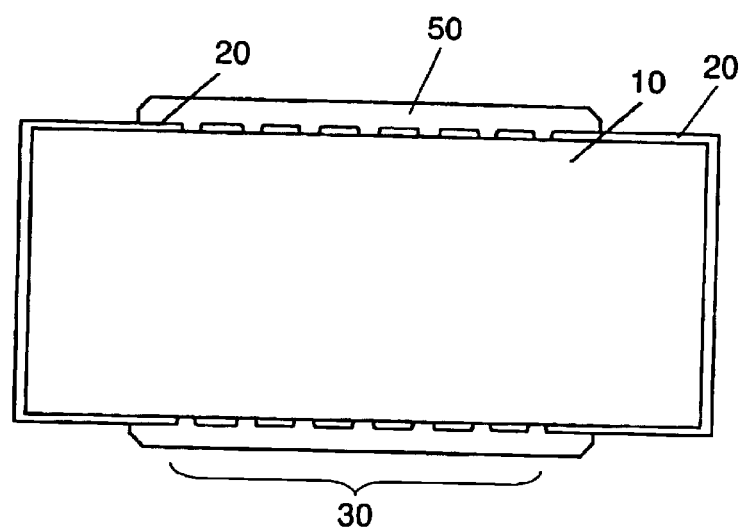
FIG. 15 is a sectional view illustrating the method of manufacturing the electronic component in accordance with the exemplary embodiment of the present invention.

Next, remove resist film 40 formed on both the ends of the element as shown in FIGS. 14 and 15. For instance, when resist film 40 formed of energy beam degradation resin is removed, ultraviolet is irradiated to resist film 40, then film 40 coating the element is developed with developer. Resist film 40 is removed nearly 100%, which allows film 20 to appear.

Figure 16:
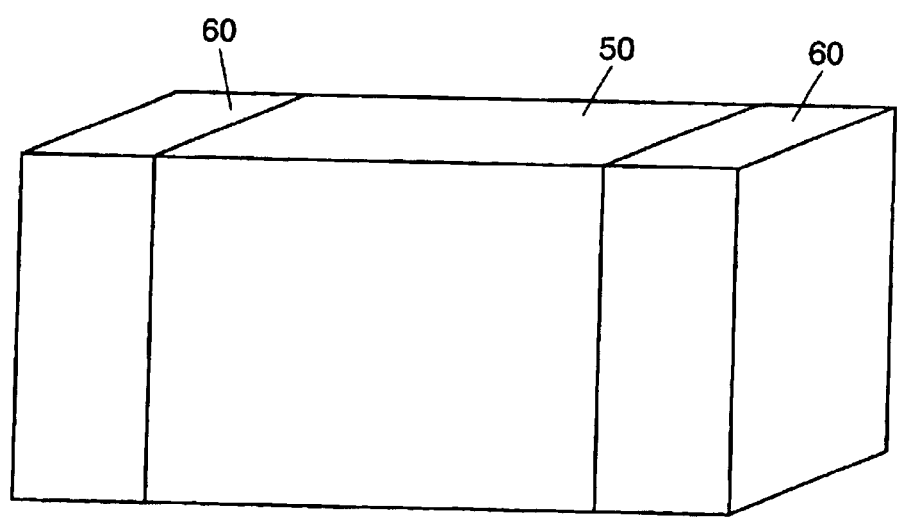
FIG. 16 is a perspective view illustrating the method of manufacturing the electronic component in accordance with the exemplary embodiment of the present invention.
Figure 17:
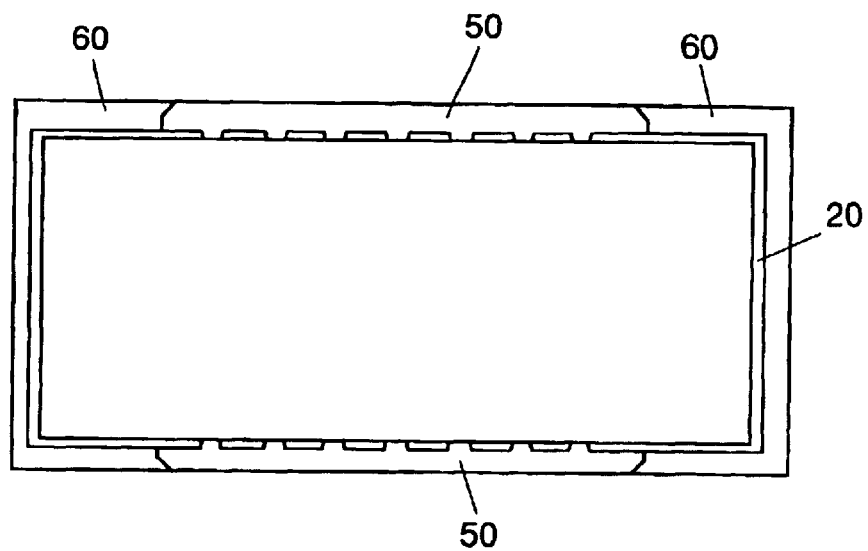
FIG. 17 is a sectional view illustrating the method of manufacturing the electronic component in accordance with the exemplary embodiment of the present invention.

Film 20 showed up at both the ends can be used as terminal sections, thereby completing the electronic component. Further, if better coupling with a circuit board is taken into consideration, it is preferable to form terminal electrodes 60 as shown in FIGS. 16 and 17. Terminal electrodes 60 are formed on film 20 showed up at both the ends of the element.

Electrode 60 is formed by laminating plural conductive layers or formed of a single conductive layer. Thin-film forming methods such as plating, sputtering, or vapor deposition method are available for forming terminal electrode 60. Applying and baking conductive paste is also available as one of the methods for forming terminal electrode 60. In this embodiment, a plating method, an electroplating method among others, is used because a large amount of electrodes 60 can be manufactured at a time, and yet, protective member 50 can be used as a pattern.

Terminal electrode 60 is formed by laminating at least one of anticorrosion film or bonding film, or formed of a single layer thereof. The anticorrosion film is preferably formed of anticorrosion metal film made from Ti, Ni, W, Cr or the like, or made of alloyed metal of the foregoing metals such as Ni—Cr. The film thickness is preferably 0.5 to 3 μm.

Using simple Ni or Ni alloy, among others, produces advantages in property and cost. Further, bonding film made from solder or bonding material free from Pb can be provided on the anticorrosion film or film 20.

The thickness of the bonding film ranges from 5 to 10 μm.

The bonding material free from Pb is made of simple Sn or Sn including at least one of Ag, Cu, Zn, Bi, and In. This structure allows terminal electrode 60 to strengthen its anticorrosion property and improve its coupling with a circuit board and the like.

The surface of terminal electrode 60 preferably protrudes from the surface of protective member 50 by at least 2 μm. The protruding height is preferably not more than 7 μm because this amount does not adversely affect the productivity of the electronic component. The structure discussed above allows terminal electrodes 60 on both the ends to be brought into contact with the land on the circuit board when the electronic component is mounted to the circuit board, thereby improving mounting efficiency.

The electronic component thus manufactured includes protective member 50 that is patterned using resist film 40. This protective member 50 can be therefore formed more accurately than a conventional protective member formed by applying paste. Further, it can prevent electrodeposited film from attaching to places which do not need the film.

Thus this protective member 50 does not involve removing the electrodeposited film. As a result, using this protective member 50 improves the productivity of the electronic component.

The foregoing structure reduces the height difference of the bumpy surface at the boundary between protective member 50 and film 20 on both the ends or the boundary between protective member 50 and terminal electrodes 60 to not more than 7 μm. As a result, film 20 to be a terminal section, or terminal electrode 60 can be formed substantially accurate in dimension, so that the element-standing upright phenomenon can be prevented.

The electronic component discussed above preferably has the following dimension: (length=L1, width=L2, and height=L3)

L1=0.2 to 2.0 mm (more preferably 0.2 to 1.0 mm)
L2=0.1 to 1.0 mm (more preferably 0.1 to 0.5 mm)
L3=0.1 to 1.0 mm (more preferably 0.1 to 0.5 mm)

Those dimensional ranges are useful for small electronic components, and particularly useful for the electronic component of 1.0×0.5 mm size, 0.6×0.3 mm size, and 0.4×0.2 mm size, namely, the electronic components ranging from 0.4×0.2 mm to 1.0×0.5 mm size.

The downsizing of electronic components requires highly accurate dimensions at the terminal sections on both the ends, because mounting efficiency depends on the dimensional accuracy, and poor accuracy tends to invites the element-standing upright phenomenon.

In this embodiment, the electronic component, where element section 30 is prepared on the surface of base 10, is demonstrated; however, the present invention can be applied to an electronic component where element section 30 is embedded in the base for providing protective member 50.

In this embodiment, element section 30 is formed on the overall lateral faces of base 10, and protective member 50 is also provided to the overall lateral faces of base 10. However, element section 30 can be formed on a single lateral face or a few faces and protective member can be provided just on element section 30 (not on the overall lateral faces). For instance, in the case of using a plate-like base 10, element 30 is prepared on a single lateral face of base 10, and protective member 50 is formed on that single lateral face, whereby a plate-like electronic component is completed.

Figure 11:
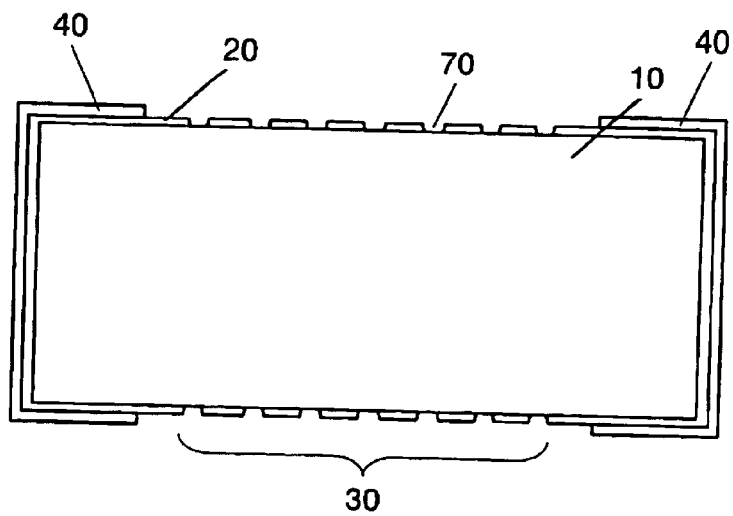
FIG. 11 is a sectional view illustrating the method of manufacturing the electronic component in accordance with the exemplary embodiment of the present invention.
Figure 18:
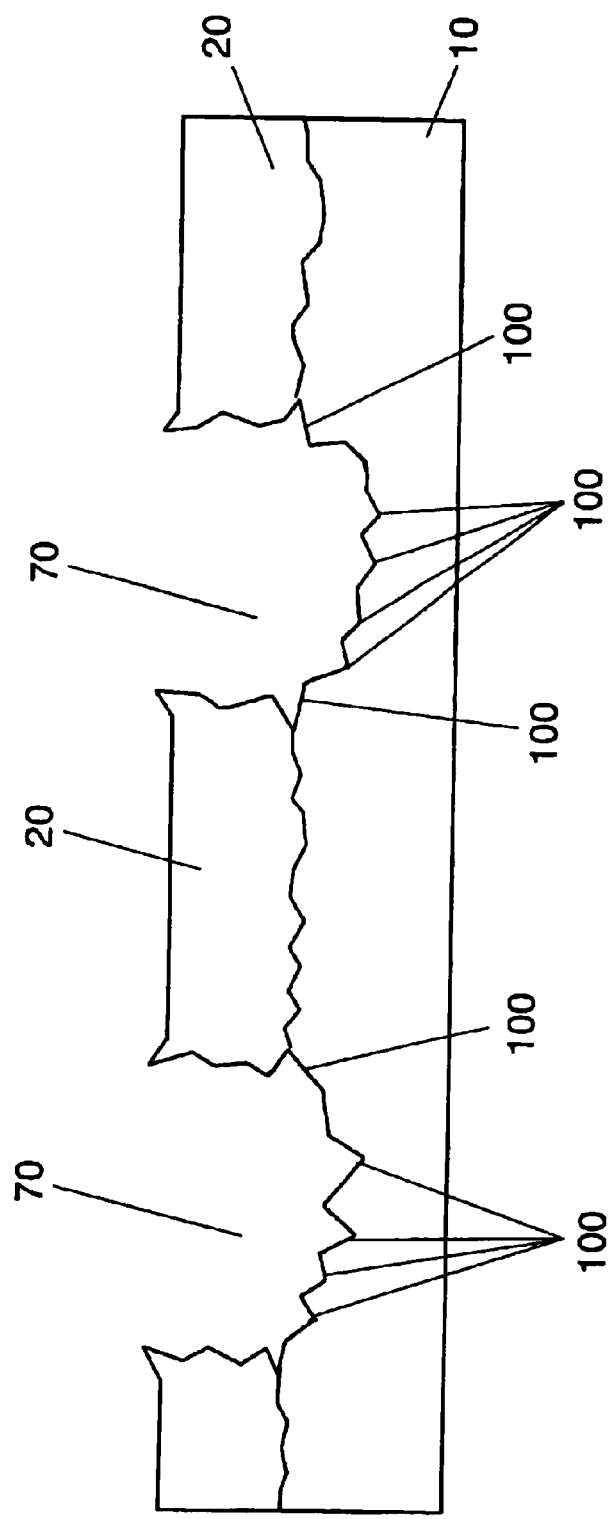
FIG. 18 is a sectional view illustrating the method of manufacturing the electronic component in accordance with the exemplary embodiment of the present invention.

FIG. 18 shows magnified grooves 70 shown in FIG. 11. In FIG. 11, it seems that grooves 70 are formed only on film 20; however, as shown in FIG. 18, grooves 70 are actually formed also on base 10 when laser beam or grinding wheel process is used to form grooves 70 on film 20.

At this time, rather large recesses 100 are formed in great numbers at the bottom of grooves 70 on base 10.

A conventional manufacturing method forms protective member 50 directly on the bottom of grooves 70 with recesses 100 left as they are, thus protective member 50 does not adhere to base 10 sufficiently. Because protective member 50 is made of resin material, while base 10 is made of inorganic material such as ceramic. Therefore, bonding strength has not been improved.

Figure 19:
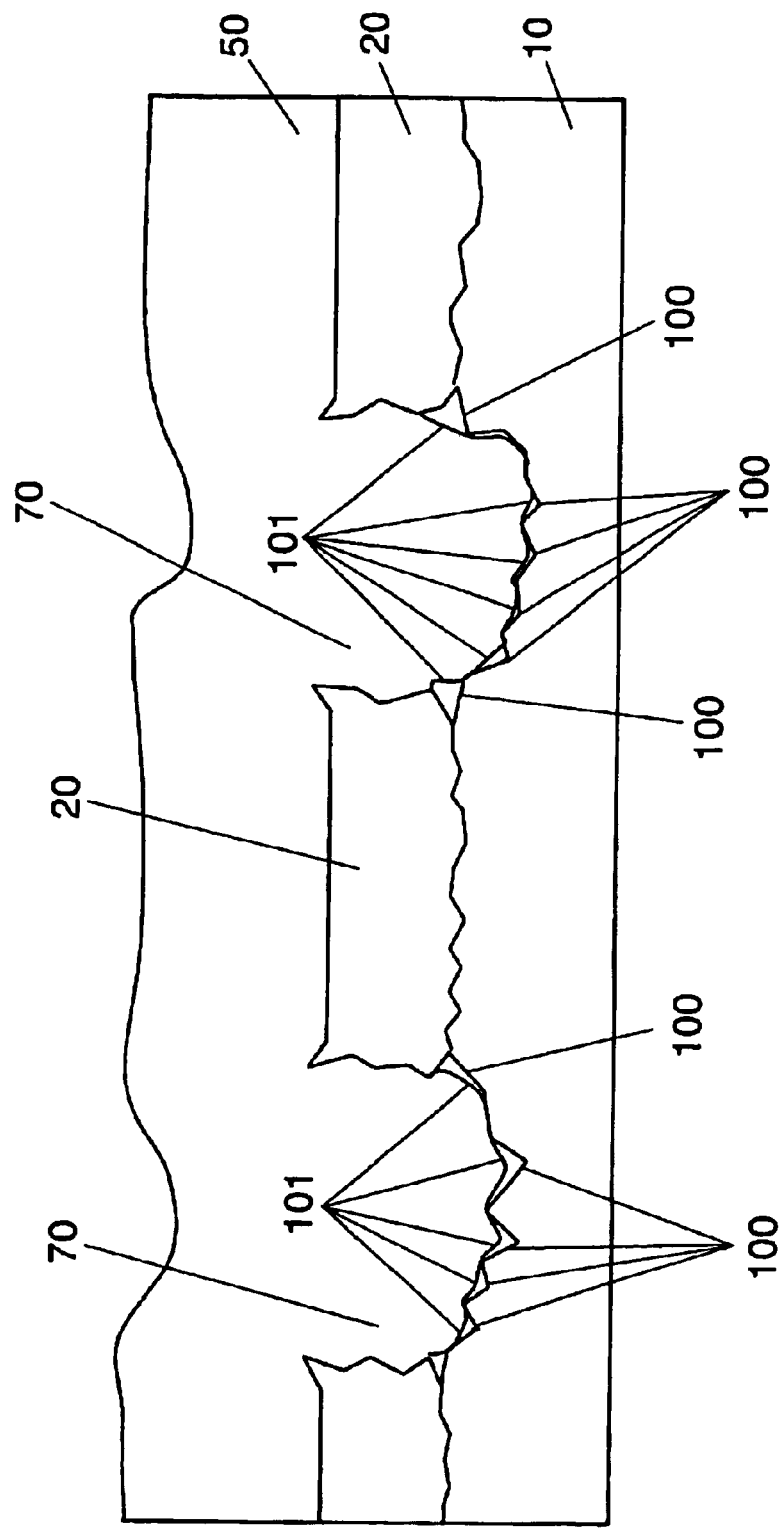
FIG. 19 is a sectional view illustrating the method of manufacturing the electronic component in accordance with the exemplary embodiment of the present invention.

In this embodiment, resin sections 101 are prepared in recesses 100 on the bottom of grooves 70 as shown in FIG. 19 in order to fill up recesses 100. Then protective member 50 is formed, so that the entire groove 70 is filled up. Since both of protective member 50 and resin section 101 are made of resin, stronger bonding strength can be expected. This structure can prevent detachment.

In this embodiment, resist film 40 is used for patterning.

When this resist film is removed, it is adjustable to leave parts of film 40 in recesses 100 of the grooves. For instance, adjusting the time of dipping the element in the developer, or an appropriate selection of developers can leave resist film 40 as resin section 101 in the entire or parts of recesses 100.

As discussed above, resin section 101 undergone exposure or development remains on the bottom of the grooves formed on base 10, and bonds to base 10 rather strongly.

After protective member 50 is formed, protective member 50 is strongly bonded to resin section 101, and even thin protective member 50 can be provided to the element with sufficient strength. Providing heat treatment to protective member 50 further increases the bonding strength to resin section 101.

Parts of resist film 40 can be left as resin section 101, so that another material is not needed to produce resin section 101. This structure thus increases the productivity. Of course, epoxy resin other than resist film 40 can be applied to form resin section 101.

When grooves are cut on the patterned film 20 by etching, the surface exposed from the base becomes rather bumpy because of the etching. In such a case, resin section 101 is formed in the recesses produced by the etching.

What is claimed is:

1. An electronic component comprising:
   a base;
   a film provided to said base;
   a groove formed on both of said base and said film;
   a resin section provided in a recess formed on a bottom of said groove;
   a protective member for covering said groove and being bonded to said resin section; and
   a terminal section provided to both ends of said base and sandwiching said protective member.

2. The electronic component of claim 1, wherein said resin section and said protective member are made of resin material different from each other.

3. The electronic component of claim 1, wherein said resin section and said protective member are made of electrodeposited film.

4. The electronic component of claim 1, wherein said film comprises either a conductive film or a resistive film.

5. The electronic component of claim 1, wherein a material of said film is at least one material selected from the group consisting of gold, silver, copper, carbon, Ni—Cr, ruthenium oxide and nickel.

6. The electronic component of claim 1, wherein a thickness of said protective member ranges from 10 to 25 $\mu$m.

7. The electronic component of claim 1, wherein said terminal section is a terminal electrode formed by laminating at least one of an anticorrosion film or a bonding film, or comprises a single layer thereof.

8. The electronic component of claim 1, wherein said protective member comprises an electrodeposited resin film.

9. The electronic component of claim 8, wherein said electrodeposited resin film comprises at least one resin selected from the group consisting of acrylic resin, epoxy resin, fluorine-based resin, urethane-based resin and polyimide-based resin.

10. The electronic component of claim 1, wherein said resin section comprises a resist film.

11. The electronic component of claim 10, wherein said resist film comprises either an energy beam curable resin or an energy degradation resin.

12. The electronic component of claim 10, wherein said resist film comprises either an epoxy resin or an acrylic resin.

13. The electronic component of claim 1, wherein said base is shaped like a polygonal pillar and the corners are chamfered.

14. The electronic component of claim 7, wherein said anticorrosion film comprises at least one metal selected from the group consisting of Ti, Ni, W and Cr.

15. The electronic component of claim 7, wherein said anticorrosion film comprises Ni—Cr.

16. The electronic component of claim 7, wherein said bonding film comprises either a solder or a binding material free from Pb.

17. The electronic component of claim 7, wherein a surface of said terminal electrode protrudes from a surface of said protective member by at least 2 $\mu$m.

* * * * *